US006953936B2

(12) United States Patent
MacPherson, III et al.

(10) Patent No.: US 6,953,936 B2
(45) Date of Patent: Oct. 11, 2005

(54) IONIZATION TYPE SMOKE SENSING CHAMBER

(75) Inventors: William A. MacPherson, III, West Chicago, IL (US); Gregory A. Wischstadt, Streamwood, IL (US)

(73) Assignee: Honeywell International, Inc., Morristown, NJ (US)

( * ) Notice: Subject to any disclaimer, the term of this patent is extended or adjusted under 35 U.S.C. 154(b) by 224 days.

(21) Appl. No.: 10/356,142

(22) Filed: Jan. 31, 2003

(65) Prior Publication Data

US 2004/0001006 A1 Jan. 1, 2004

Related U.S. Application Data

(60) Provisional application No. 60/392,123, filed on Jun. 27, 2002.

(51) Int. Cl.[7] ................................................ G01N 27/62

(52) U.S. Cl. ....................................... 250/384; 250/381

(58) Field of Search ................................ 250/381, 384; 340/629, 628, 693.6

(56) References Cited

U.S. PATENT DOCUMENTS 4,361,763 A 11/1982 Bryant et al.
4,937,562 A * 6/1990 Kaminaka et al. ....... 340/693.6
5,160,916 A 11/1992 Ishii et al.
5,327,119 A 7/1994 Ishii
5,351,034 A * 9/1994 Berger et al. ............... 340/577
6,057,775 A 5/2000 Sakurai et al.

FOREIGN PATENT DOCUMENTS

GB 2014782 A * 8/1979 ............ H01J/39/28
GB 2137390 A * 10/1984 ........... G08B/17/00
JP 64-57398 A * 3/1989 ........... G08B/17/10

* cited by examiner

*Primary Examiner*—Constantine Hannaher
(74) *Attorney, Agent, or Firm*—Welsh & Katz, Ltd.

(57) ABSTRACT

A modular smoke detector has a sensing electrode carried by an insulator module. The insulator module also carries an ionization source and a field effect transistor. The insulator module lockingly engages a printed circuit board. A conical smoke deflector and exterior electrode are assembled to the insulator module. The deflector and exterior electrode are spaced apart providing a space for inflow and outflow of airborne particles of combustion.

66 Claims, 4 Drawing Sheets

IONIZATION TYPE SMOKE SENSING CHAMBER

The benefit of a Jun. 27, 2002 filing date for Provisional Patent Application Ser. No. 60/392,123 is hereby claimed.

FIELD OF THE INVENTION

The invention pertains to ionization-type smoke detectors. More particularly, the invention pertains to such detectors which have a modular substructure which carries the sensing electrode and ionization source.

BACKGROUND OF THE INVENTION

Known ionization-type smoke detectors include spaced apart ionization source, sensing electrode, active chamber closed by an exterior electrode. Spaces or openings are usually provided to facilitate the inflow and outflow of airborne smoke which can be detected in the active chamber. A high impedance circuit is usually coupled to the sensing electrode.

While known detectors are effective for sensing airborne smoke, they require a number of manufacturing steps given the number of required parts. It would be preferable if the parts of the detector could be configured such that the number of manufacturing steps could be reduced. This will in turn improve manufacturability and reduce cost. Additionally, it would be desirable if at least some of the parts could be snap-fit together to reduce the number of soldering steps needed to assemble a detector.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
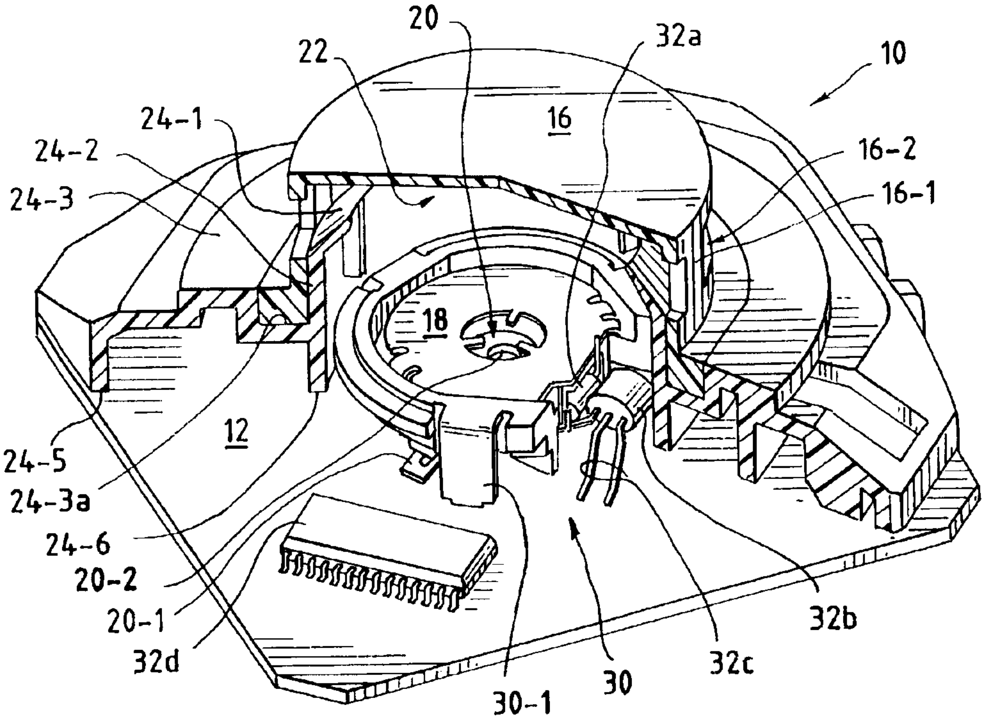
FIG. 1 is an enlarged perspective view partly cut away of a detector in accordance with the invention.

While embodiments this invention can take many different forms, specific embodiments thereof are shown in the drawings and will be described herein in detail with the understanding that the present disclosure is to be considered as an exemplification of the principles of the invention and is not intended to limit the invention to the specific embodiments illustrated.

An ionization type smoke sensing chamber exhibits improved stability to environmental conditions. More specifically, the chamber maintains a stable reference value and smoke characteristics under the influence of air velocity currents not containing smoke particles. The configuration allows for the opening for smoke entry into the chamber to be much larger than known ionization smoke sensing chambers. These larger openings enable more smoke particles to enter the chamber.

The detector includes three electrodes. The inner or source electrode carries the radioactive source. A sensing electrode contains an opening for the radiation to pass through to the sensing chamber or volume. An outer electrode closes the chamber.

The outer electrode is separated from the sensing electrode by a slit or window that allows smoke to enter the sensing volume. The opening in the sensing electrode is configured so as to block some of the radiation of the radioactive source from entering the sensing volume. Blocking is achieved by partly filling the opening with inwardly extending features such as tabs of various shapes. Representative shapes include rectangles, squares, triangles, semicircles, or semi-ellipses.

The details that block some of the radioactive particles from entering the sensing volume are preferably symmetrical about a central axis. The blocking details will improve detector performance at higher ambient air/smoke velocities.

The outer electrode is configured such that it has a large cylindrical slit or window opening to allow smoke to enter the sensing volume or chamber. In one embodiment, the slit or window has a height on the order of one-quarter inch. The shape of the opening is modified by an interior cone that directs smoke entering the chamber toward and across the interior top surface of the outer electrode inside the sensing volume.

As the velocity of incident smoke increases, the cone forces the smoke closer to the interior top surface of the outer electrode. As described subsequently, a majority of recombination will occur at the interior top surface of the outer electrode. Thus, making this region of the chamber the most sensitive to smoke particles.

The configuration of the electrodes also provides a simplified assembly method. An insulator carries the inner and sensing electrodes spaced apart from one another. The insulator that separates the electrodes is also configured to carry a semiconductor buffer. The impedance of the center electrode is transformed by the buffer so that standard electrical circuits may be used to measure the voltage of the sensing electrode and thus, the amount of smoke present.

The insulator is configured so that the inner electrode, which carries the radioactive source, the sensing electrode, the buffer and a series resistor or diode can all be assembled to the insulator. The buffer and series resistor or diode are encapsulated in a protective coating that minimizes the effects of contamination of the chamber operation.

The insulator assembly can be mechanically attached to a printed circuit board that contains the remaining circuitry necessary for the detector. The source and the drain leads of the buffer can then be soldered to the printed circuit board. The outer electrode is then also mechanically attached to the printed circuit board, completing the assembly of the smoke sensing chamber.

The assembly of the chamber is simplified since the entire leakage sensitive portion for the chamber can be assembled independently of the remaining detector circuitry thereby minimizing the chances of contamination of one or more of the chamber electrodes. The last assembly step, attaching the outer electrode to the printed circuit board, also effectively seals the chamber from foreign debris normally associated with the manufacturing processes.

Another advantage of the above described insulator is that the source electrode does not need to be soldered to the detector printed circuit board. It is electrically coupled to the printed circuit board by a pressure contact. The source electrode can be configured with one or multiple spring contacts. As it is inserted into the insulator, the source electrode spring contact(s) will make a pressure contact with pads on the detector printed circuit to establish an electrical connection.

The printed circuit board's pads may be made of copper that is covered by solder or another material to reduce corrosion potential. The use of two spring contacts provides duplicate connections for reliability.

It will be understood that the exact details of the spring contact(s) is/are not a limitation of the invention. Deflectable or compressible contacts all come within the spirit and scope of the invention.

FIG. 1 illustrates various aspects of a detector 10 in accordance with the present invention. The detector 10 can be assembled on a printed circuit board 12 as a modular self-contained unit. The detector 10 includes an outer electrode 16, a sensing electrode 18 and a reference or inner electrode generally indicated at 20.

The outer electrode 16 has a generally cylindrical shape with side walls such as 16-1 which define a plurality of elongated rectangular slits or windows 16-2 which enable smoke to enter into an interior sensing volume indicated generally at 22.

The sensing volume 22 is defined in part by a tapered or partially conical surface 24-1 which is carried by a vertical cylindrical side wall 24-2. The side wall 16-1 extends along and outside of the side wall 24-2 relative to the sensing region 22. It slidably engages a circular mounting region 24-3 at an annular region 24-3*a*.

The circular mounting region 24-3 is in turn mechanically attached to the printed circuit board 12. It will be understood that a gasket could be interposed between a lower edge 24-5 and the printed circuit board 12. An additional gasket could be located between surface 24-6 and the printed circuit board 12.

As described in more detail subsequently, the slits or windows 16-2 in combination with tapered annular surface 24-1 facilitate the ingress and egress of smoke from the adjacent ambient atmosphere into the sensing region or chamber 22. The surface 24-1 facilitates and improves performance of the detector 10 at higher flow velocities such that the openings 16-2 can be larger thereby providing improved performance at lower flow velocities.

Electrodes 18 and 20 are carried on and locked to a cylindrical insulating structure generally indicated at 30 and can be processed as a modular sub-assembly of the detector 10. Additionally, the insulator 30 carries those electrical components which directly interface with sensing electrode 18, a very high impedance output. These components include a resistor or a diode 32*a* which is coupled in series between electrode 18 and a gate input of a semiconductor buffer 32*b*.

The buffer 32*b* could be implemented, for example, as a field effect transistor with a high impedance input gate as would be understood by those of skill in the art. Source and drain connections indicated generally at 32*c* can in turn be electrically coupled to conductor traces on printed circuit board 12 and in turn electrically coupled to control circuitry 32*d* carried on printed circuit board 12.

Figure 3A:
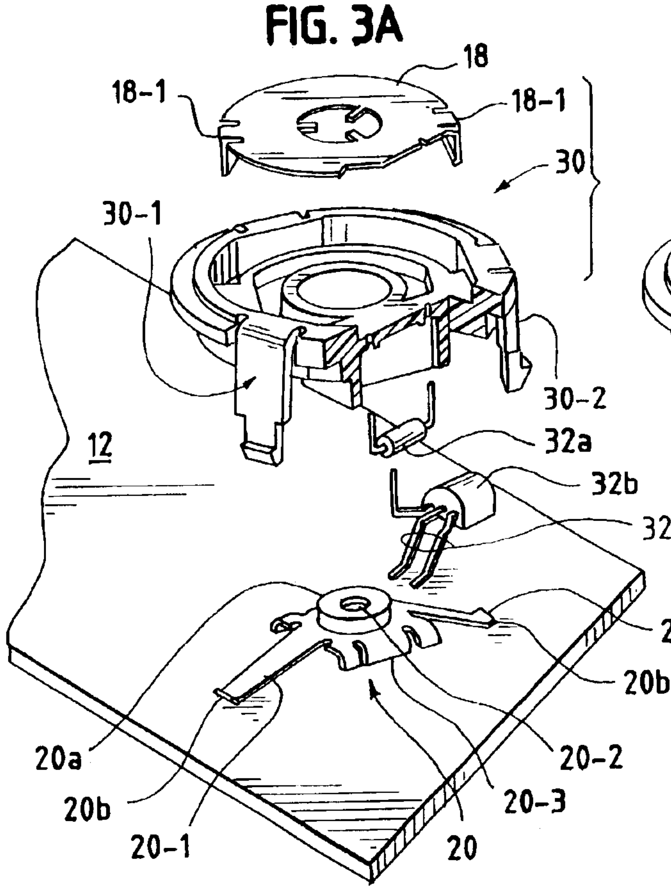
FIGS. 3A–3D are alternate views of portions of the detector of FIG. 1.
Figure 3B:
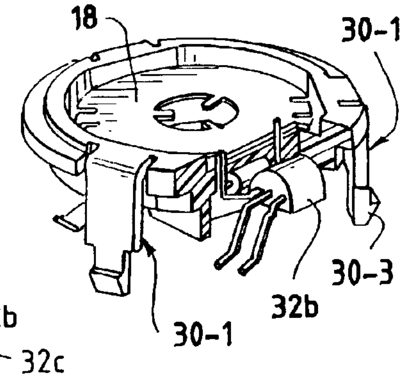
Figure 3C:
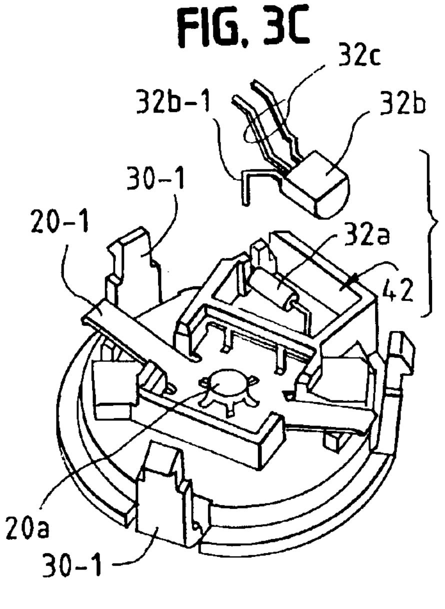
Figure 3D:
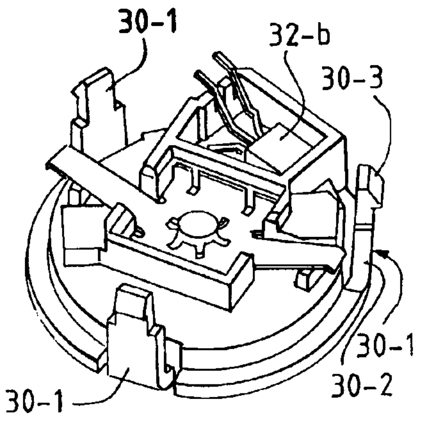

The insulating assembly 30 can be mechanically attached to printed circuit board 12 via a plurality of spaced apart deflectable connector legs such as the leg 30-1, best seen in FIGS. 3A, 3B. Legs such as the leg 30-1 extend from the assembly 30 and are radially deflectable so as to slidably engage lock to slots in the printed circuit board 12. It will be understood that the exact nature and configuration of the locking mechanism of the legs 30-1 with the printed circuit board 12 is not a limitation of the present invention.

As described in more detail subsequently, the assembly 30 including electrodes 18, 20 and components 32*a, b* can be assembled as a modular sub-unit of the detector 10 and connected mechanically to printed circuit board 12 via legs 30-1. As a result, the high impedance electrode/component sub-assembly 18, 31*a*, 32*b* can be isolated from other manufacturing operations involving either the printed circuit board 12, control circuitry 32*d* or outer electrode 16 and exterior assembly or housing 24-3.

Also as explained in more detail subsequently, the inner electrode 20 can be electrically coupled to conductors or traces on printed circuit board 12 and subsequently to control circuitry 32*d* via one or more deflectable electrical connector elements 20-1. The connector elements 20-1 resiliently engage metal pads on the printed circuit board 12 thereby electrically coupling the electrode 20 to the control circuitry 32*d*.

It will be understood that the electrode 20 can carry a selected ionization source 20*a* adjacent to an opening 20-2 formed therein as part of the modular assembly provided by the assembly 30.

Figure 2:
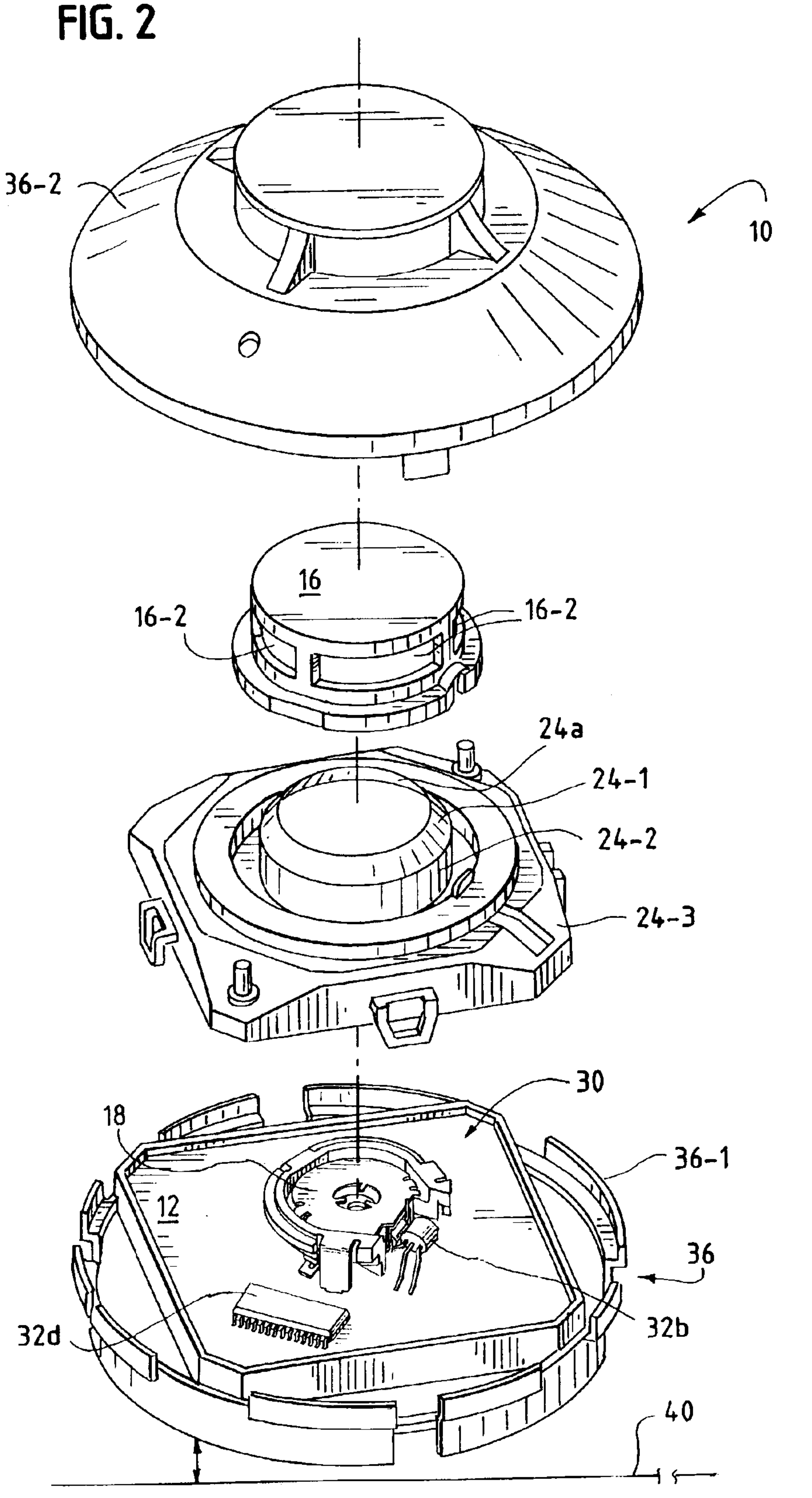
FIG. 2 is an exploded view of the detector of FIG. 1.

FIG. 2 is an exploded view illustrating various components of the detector 10. The detector 10 can be assembled on a base 36 of a generally cylindrical shape which mechanically carries and supports the printed circuit board 12 and other components thereon as discussed previously relative to FIG. 1. As will be understood by those of skill in the art, the control circuitry 32-*d* can be an electrical communication via a bi-directional communication link generally indicated at 40 with other detectors, control elements, or circuitry without limitation. The detector 10 can be enclosed by an exterior cover 36-2.

FIGS. 3A, B, C and D illustrate additional details of the sub-assembly 30. The sensing electrode 18 is mechanically attached to insulator 30 by spaced apart deflectable integrally formed latching members 18-1 which slidably engage slots in insulator 30.

The inner or source electrode 20 is mechanically attached to insulator 30 along a common center line with the electrode 18 by outwardly extending frictional locking members indicated generally at 20-3 which slidably engage locking surfaces of the insulator 30. Hence, the insulator 30 carries both sensing and inner electrodes 18, 20. Additionally, as illustrated in FIGS. 3A–3D, diode or resistor 32*a* and buffer semi-conductor 32*b* are carried in a bounded region generally indicated at 42, best seen in FIG. 3C. One contact of resistor 32*a* is electrically and mechanically attached to sensing electrode 18. The other contact of resistor 32*a* is mechanically and electrically attached to gate input 32*b*-1 of buffer 32*b* to form a series connection.

The region 42 can be filled with an encapsulating compound so as to mechanically enclose the components 32*a*, 32*b* therein. The inner electrode 20, noted above, carries an ionization radioactive source 20*a* of a type known to those of skill in the art to provide a source of charged particles and a current which can be altered by smoke in the sensing region 22 as would be known and understood by those of skill in the art.

Each of the legs 30-1 of the insulator 30 has an integrally formed elongated deflectable portion 30-2 which extends generally axially relative to the insulator 30. The deflecting member 30-2 terminates in a locking element 30-3 which in combination with the deflection of the members 30-2 slidably engages the printed circuit board 12 and locks the insulator 30, along with electrodes 18, 20 and components 32*a, b* thereto as a unit.

As illustrated in FIGS. 3A–3D, the inner electrode 20 carries at least one and preferably a plurality of spring biased conductors 20-1, illustrated herein as deflectable members with an end region 20*b* that slidably engages an electrical contact on the printed circuit board 12. It will be understood that as the insulating member 30 moves toward the printed circuit board 12 slidably engaging same via latching elements 30-3, the deflectable conducting members 20-1, and surfaces 20-*b* slidably engage respective electrical contacts on the printed circuit board 12 thereby placing the electrode 20 in electrical communication with the control circuitry 32*d*.

It will be understood that the exact details of the spring members 20-1 are not a limitation of the present invention. Alternately, instead of being deflectable spring members, they could be compressible spring members without departing from the spirit and scope of the present invention. Similarly, the electrodes 18, 20 can be fixedly connected to the insulator 30 by a variety of structures. The connecting structures 18-1 and 20-3 are exemplary only and not limitations of the present invention.

Figure 4:
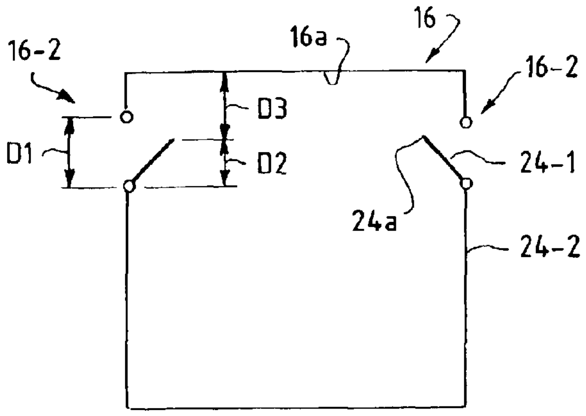
FIG. 4 is a side sectional schematic view illustrating relative dimensions of structural elements of the detector of FIG. 1.

FIG. 4 illustrates additional details of the relationship between the slits or windows 16-2 and the tapered surface 24-1. As noted previously, the conical structure 24-1 improves stability of the detector 10 at higher fluid velocities of several hundred feet per minute and above. The effect of the conical structure 24-1 is to permit the slits or windows 16-2 to have a greater height dimension, thereby improving performance at lower velocities without degrading higher velocity performance.

The height dimension D1 can be maximized for low velocity performance. For example, the dimension D1 can be on the order of 0.25 inches or greater.

Preferably, dimension D2 will be in a range of 50% to 120% of dimension D1. The dimension D3, the opening between the top surface 24*a* of the conical structure 24-1 and interior surface 16*a* of outer electrode 16 preferably will fall in a range of 50 to 100% of the dimension D1. Preferably, dimension D3 will be about 75% of dimension D1. The conical structure 24-1 directs incoming smoke particles toward surface 16*a* at higher flow velocities where particle recombination will be strongest.

Figure 5A:
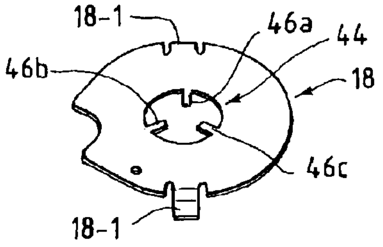
FIGS. 5A–5E illustrate alternate configurations of a sensing electrode usable with the detector of FIG. 1.

FIG. 5A illustrates sensing electrode 18. The electrode 18 defines an interior opening 44 which permits a flow of ionized particles from source 20*a* to flow into sensing region 22 as will be understood by those of skill in the art.

The performance of detector 10 can be improved at higher velocities by providing a plurality of protrusions, such as exemplary protrusions 46*a, b, c* which extend into and reduce the area of the opening 44. Preferably the protrusions will reduce the area of the opening 44 on the order of 10 to 30%. By increasing the reduction of the area of the opening 44, variations in the output signal from electrode 18 can be minimized at higher velocities.

Figure 5B:
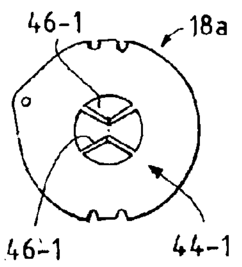

FIGS. 5B, C, D, and E illustrate alternate configurations of the opening 44 and protrusions 46*a, b* and *c*. Electrodes 18*a–d* have an exterior periphery different than the periphery of the electrode 18. Other such variations come within the spirit and scope of the invention.

Figure 5C:
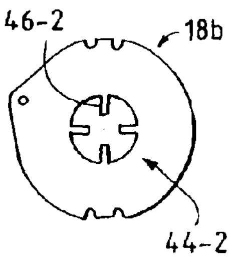
Figure 5D:
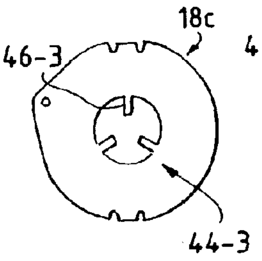
Figure 5E:
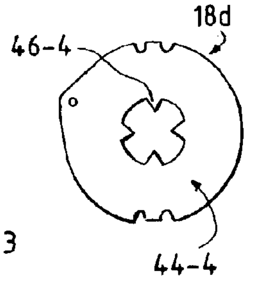

In FIG. 5B, the area of opening 44-1 can be reduced by V-shaped members 46-1 which extend into and extend through opening 44-1. In FIG. 5C, the area of opening 44-2 can be reduced by a plurality of four inwardly extending tabs 46-2. In FIG. 5D, electrode 18*c*, has an interior opening 44-3 whose area is reduced by a plurality of inwardly extending protrusions or tabs 46-3. Finally, FIG. 5E illustrates a sensing electrode having a central opening 44-4 whose area is reduced by a plurality of V-shaped tabs 46-4 which interrupt the perimeter of the opening 44-4. Other shapes which alter the periphery of a respective opening such as 44, 44-1 . . . -4 come within the spirit and scope of the invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A smoke detector comprising:

a sensing chamber for ambient smoke, the sensing chamber incorporating a tapered, insulative structure with a region adjacent to a selected electrode whereby the tapered structure directs smoke toward the selected electrode wherein the selected electrode comprises an outer electrode, a sensing electrode is displaced therefrom with the tapered structure therebetween and wherein the sensing electrode defines an interior bounded opening and includes a plurality of protrusions, each of which extends into and partly closes the opening.

2. A detector as in claim 1 which comprises a solid state element with one contact coupled to the sensing electrode and at least one additional contact.

3. A detector as in claim 1 which includes a second insulative structure which carries the sensing electrode and sensing circuitry coupled thereto.

4. A detector as in claim 1 wherein the protrusions each have a shape which comprises one of a square, a rectangle, a triangle, a semicircle, or a semi-ellipse.

5. A smoke detector comprising:

a sensing chamber for ambient smoke, the sensing chamber incorporating a tapered, insulative structure with a region adjacent to a selected electrode whereby the tapered structure directs smoke toward the selected electrode; and wherein the sensing electrode includes a plurality of protrusions, each of which extends into and partly closes the opening; wherein the selected electrode comprises an outer electrode, a sensing electrode is displaced therefrom with the tapered structure therebetween; wherein the sensing electrode defines an interior, bounded opening; which includes a second insulative structure which carries the sensing electrode and sensing circuitry coupled thereto;

wherein the second insulative structure carries an ionization source spaced from the sensing electrode wherein the ionization source carries at least one spring contact.

6. A detector as in claim 5 wherein the source carries a second spaced apart contact.

7. A detector as in claim 5 wherein the sensing circuitry comprises a solid state impedance transforming element with one contact coupled to the sensing electrode and at least one additional contact.

8. A detector as in claim 7 which includes a circuit board coupled to the spring contact and the additional contact.

9. A detector as in claim 7 wherein the sensing electrode and impedance transforming element are locked to the second insulative structure.

10. A detector for monitoring a region for airborne particles of combustion comprising:

an ionization source;

a sensing electrode;

a sensing chamber wherein the sensing chamber is bounded at least in part by a cylindrical member and an end conductive member wherein the cylindrical member has a generally conically shaped end section and wherein the end conductive member is displaced from the end section by a separation such that airborne particles of combustion enter the sensing chamber through the separation an can be sensed by the sensing electrode, and where the source carries at least one spring biased conductor.

11. A detector as in claim 10 which includes an amplifier carried adjacent to the sensing electrode and wherein the sensing electrode defines a bounded, open interior region.

12. A detector as in claim 10 wherein the source comprises first and second spring biased conductors.

13. A detect as in claim 10 wherein the separation defines a plurality of openings to enable airborne particles of combustion to flow into and out of the sensing chamber.

14. A detect as in claim 13 with the openings circumferentially located adjacent to the end section.

15. A detector as in claim 10 wherein the end section has a tapered surface extending away from the separation.

16. A detector as in claim 15 wherein the sensing electrode defines an interior opening with a bounded periphery.

17. A detector as in claim 16 wherein the periphery is interrupted by at least one protrusion which extends therefrom.

18. A detector as in claim 17 wherein the periphery is interrupted by a plurality of inwardly oriented protrusions.

19. A detector as in claim 17 which includes a connector and wherein the source is coupled to the connector.

20. A detector for monitoring a region for airborne particles of combustion comprising:

an ionization source;

a sensing electrode;

a sensing chamber wherein the sensing chamber is bounded at least in part by a cylindrical member and an end conductive member wherein the cylindrical member has a generally conically shaped end section and wherein the end conductive member is displaced from the end section by a separation such that airborne particles of combustion enter the sensing chamber through the separation an can be sensed by the sensing electrode, wherein the source comprises a housing which carries source of radioactive material and wherein at least a first biased connector member is carried by the housing.

21. A detect as in claim 20 wherein the housing carries first and second biased connector members.

22. An ionization-type smoke detector comprising:

a modular ionization source having an adjacent metallic member which carries at least a first biased connector member which extends therefrom;

an insulating member which carries the source; and a sensing electrode spaced from the source by an insulating member.

23. A detector as in claim 22 wherein the source, the electrode and the insulating member are combined to form a unitary structure.

24. A detector as in claim 23 wherein the insulating member contains a region for receiving a semiconductor impedance transforming component.

25. A detector as in claim 22 which includes an outer electrode displaced from the sensing electrode.

26. A detector as in claim 25 which includes a conical smoke deflector positioned between the sensing an outer electrodes.

27. A detector as in claim 25 which includes a support structure wherein the connector member is in sliding engagement therewith.

28. A detector as in claim 27 wherein the outer electrode is locked to the support structure.

29. A detector as in claim 28 wherein the sensing electrode is coupled to a solid state buffer element carried adjacent thereto.

30. A detector as in claim 29 wherein the sensing electrode carries a conductive extension which slidably engages an input to the buffer element.

31. A detector as in claim 30 which includes a resistive element between the extension and the buffer element.

32. A detector comprising:

a housing which includes first and second spaced apart electrodes and an ionization source located adjacent to one of the electrodes wherein the other electrode defines an internal opening therethrough with a predefined periphery, the periphery is distorted by at least one surface that is adjacent to the opening and where the source carries at least one biased conductor.

33. A detector comprising:

a housing which includes first and second spaced apart electrodes and an ionization source located adjacent to one of the electrodes wherein the other electrode defines an internal opening therethrough with a predefined periphery, and a plurality of spaced apart periphery interrupting surfaces wherein some of the surfaces extend from the periphery into the opening.

34. A detector as in claim 33 wherein the surfaces are selected from a class which includes rectangular, square triangular, partly circular, and partly ellipsoidal.

35. A detector as in claim 33 wherein the surfaces reduce the area of the opening by an amount in a range on the order of 10%–30%.

36. A detector as in claim 35 wherein the shape of the surfaces is selected from a class which includes rectangular, square, triangular, partly circular, and partly ellipsoidal.

37. A detector comprising:

a two part sensing chamber wherein one part includes an insulating support which carries first and second spaced apart conducting electrodes and a solid state buffer, wherein one of the electrodes is coupled to a plurality of spaced apart spring biased contacts and the other is coupled to the buffer and wherein the other art comprises a hollow housing which receives the one part.

38. A detect as in claim 37 wherein the other part includes a third electrode and has an opening that is partly closed with a biased surface.

39. A detector as in claim 37 wherein the spring biased contacts are symmetrically dispose about an electrode centerline and each is one of a rotatable contact or a linearly movable contact.

40. A detect as in claim 37 wherein each part carries a feature for lockingly engaging a common support member.

41. A detector as in claim 40 wherein the buffer carries at least one conductor connectable to the support member.

42. A detector as in claim 41 wherein the spring biased contacts extend from the support for mechanically engaging the support member.

43. A detector as in claim 37 wherein the insulating support carries a resistor coupled between the other electrode and the buffer.

44. A detector comprising:

a sensing chamber which includes an insulating support which carries first and second spaced apart conducting electrodes and a solid state buffer, wherein one of the electrodes is coupled to first and second symmetrically arranged spring biased contacts and the other is coupled to the buffer and a hollow housing which receives the support.

45. A detector as in claim 44 which includes a third electrode and has an opening that is partly closed with biased surface.

46. A detector as in claim 44 wherein each of the spring biased contacts is one of a rotatable contact or a linearly movable contact.

47. A detector as in claim 46 wherein each spring biased contact extends from the support for mechanically engaging a support member.

48. A detector as in claim 44 wherein the support and the housing each carry a feature for lockingly engaging a common support member.

49. A smoke detector comprising:

a sensing chamber for ambient smoke, the sensing chamber incorporating a tapered, insulative structure with a region adjacent to a selected electrode whereby the tapered structure directs smoke toward the selected electrode, and a perforated sensing electrode which includes a plurality of protrusions, each of which extends into and partly closes the perforation.

50. A detector as in claim 49 where the selected electrode comprises an outer electrode, the sensing electrode is displaced therefrom with the tapered structure therebetween.

51. A detector as in claim 49 which comprises a solid state element with one contact coupled to the sensing electrode and at least one additional contact.

52. A detector as in claim 49 which includes an ionization source spaced from the sensing electrode, the ionization source carries at least one spring contact.

53. A detector as in claim 52 where the source carries a second spaced apart spring contact, the contacts couple the source electrode to selected circuitry.

54. A detector as in claim 49 where the protrusions have a shape which comprises one of a square, a rectangle, a triangle, a semicircle, or a semi-eclipse.

55. A smoke detector comprising:

a sensing chamber for ambient smoke, the sensing chamber incorporating an outer electrode, a displaced sensing electrode, and an ionization source spaced from the sensing electrode where the ionization source carries at least one spring contact.

56. A detector as in claim 55 where the sensing electrode defines an interior, bounded opening, and includes at least one protrusion which extends into and partly closes the opening.

57. A detector as in claim 56 where the sensing electrode includes a plurality of protrusions, each of which extends into and partly closes the opening.

58. A detector as in claim 56 where the protrusion has a shape which comprises one of a square, a rectangle, a triangle, a semicircle, or a semi-ellipse.

59. A detector as in claim 58 which includes a plurality of substantially identical, symmetrically disposed protrusions.

60. A detector as in claim 55 which includes a tapered, insulative structure with a region adjacent to a selected electrode whereby the tapered structure directs smoke toward the selected electrode, and a second insulative structure which carries the sensing electrode and sensing circuitry coupled thereto.

61. A detector as in claim 60 where the sensing circuitry comprises a solid state impedance transforming element with one contact coupled to the sensing electrode.

62. A detector as in claim 61 where the sensing electrode and impedance transforming element are locked to the second insulative structure.

63. A detector comprising:

a two part sensing chamber wherein one part includes an insulating support, separately formed first and second spaced apart conducting electrodes at least one of which is mechanically attached to the support, and a solid state buffer, where one of the electrodes is coupled to a spring biased contact and the other is coupled to the buffer and where the other part comprises a hollow housing which receives the one part.

64. A detector as in claim 63 wherein the other part includes a third electrode and has an opening that is partly closed with a separate biased surface.

65. A detector as in claim 64 where the spring biased contact is one of a rotatable contact or a linearly movable contact.

66. A detector as in claim 65 where the spring biased contact extends for mechanically engaging a support member.

* * * * *